United States Patent Office 3,133,295
Patented May 19, 1964

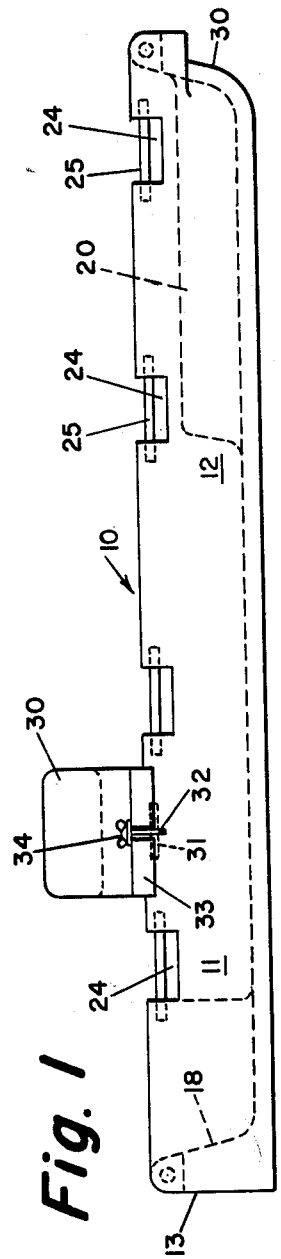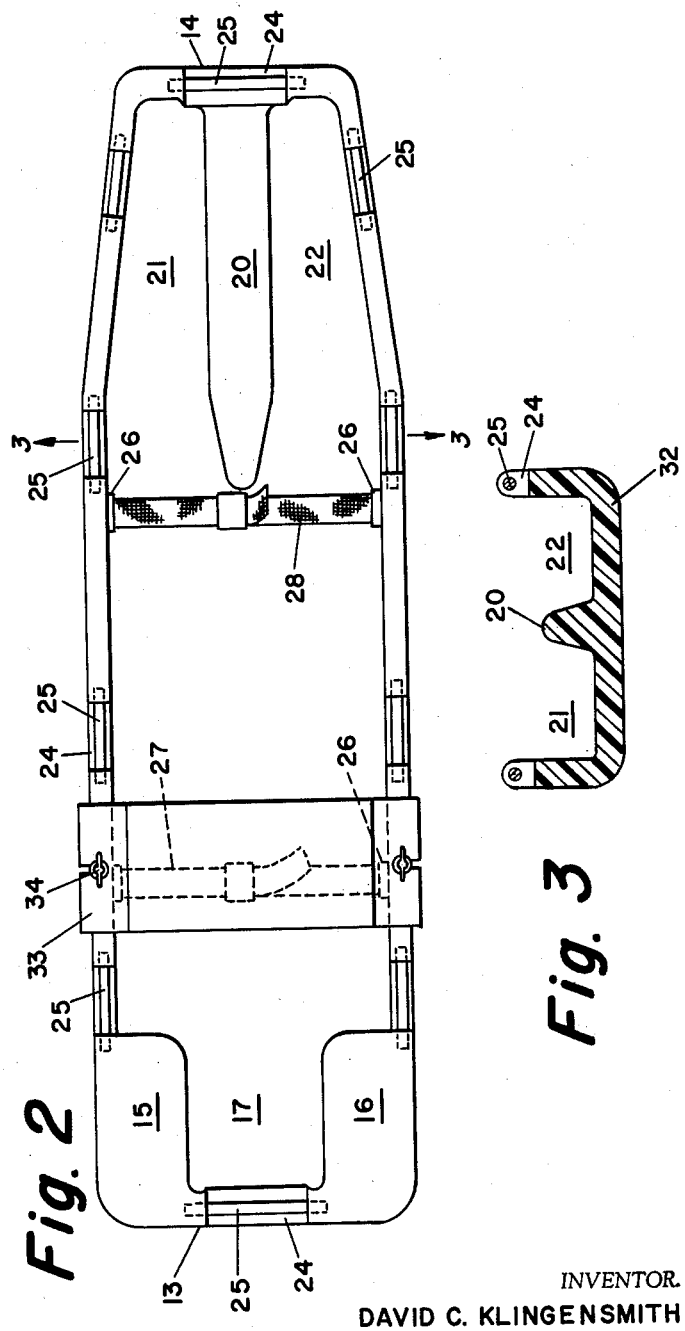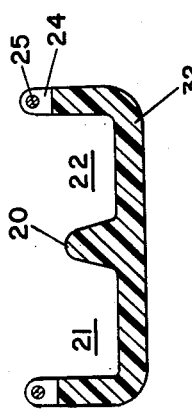

3,133,295
BUOYANT LITTER
David C. Klingensmith, Silver Spring, Md., assignor to the United States of America as represented by the Secretary of the Navy
Filed Jan. 29, 1963, Ser. No. 254,844
1 Claim. (Cl. 9—11)
(Granted under Title 35, U.S. Code (1952), sec. 266)

The invention described herein may be manufactured and used by or for the Government of the United States of America for governmental purposes without the payment of any royalties thereon or therefor.

This invention relates to stretchers or litters for patients and is concerned particularly with such devices which permit a patient to be transported safely over or through water areas.

The transport of patients between surface vessels or aircraft and a rescue boat or seaplane has always presented difficulties. Even in quiet seas, the removal of seriously injured personnel is accompanied by danger of aggravating the injuries. This is particularly true in cases of back and lower limb injury since even with the greatest possible gentleness, the handling of such injured persons without inducing additional pain is very difficult to accomplish with present equipment.

One type of equipment known as the Stokes stretcher has been used for transporting injured personnel and has been a great aid in overcoming some of the problems involved. However, this type of stretcher is difficult to handle in the water and consequently is not entirely satisfactory.

In general, this invention contemplates a litter construction for use with surface vessels or aircraft which is compactly designed to permit the ready manual transport of immobilized personnel within such vessels and to and from such vessels. The prior art litters such as the Stokes stretcher have been developed and used with the same end in view but these have been constructed of a relatively large number of components including metallic parts which are difficult to use properly and are subject to deterioration by natural elements.

According to this invention, a litter is provided which is in the form of a unitary body receiving shell constructed of a material and in a manner to provide requisite buoyancy to maintain an immobilized person afloat and in properly safe position on the water surface. Additionally, the buoyant shell is provided with integral struts which provide attaching means for receiving hoist lines and is also provided with integral connections for receiving appurtenances such as harnesses, belts, etc.

The unitary body receiving shell is formed generally of fiberglass which is preferably reinforced and a foamed plastic material. A satisfactory litter has been produced by forming the shell of a fiberglass reinforced plastic having a thickness of about one-eighth to three-sixteenths of an inch which has been determined to have sufficient rigidity to support a body having a weight of upwardly of 400 pounds. To the main portion of the shell, a head and shoulder area is formed of foamable polyurethane resin and a chest piece of the foamable material is detachably secured in the general vicinity of the chest area to provide added buoyancy to the body portion of the shell. The foamable material in its specified locations is for the purpose of maintaining the shell in a body of water at an attitude of within the range of 30°–45° from the vertical.

One object of the invention is to provide a litter of unitary and light weight construction.

Another object is to provide a litter which is constructed in a manner to provide buoyancy and to maintain a person immobilized therein in an upright position.

Other objects, advantages and novel features of the invention will become apparent from the following detailed description of the invention when considered in conjunction with the accompanying drawings, wherein:

FIG. 1 is a view in side elevation of the litter device of the invention assembled for use;
FIG. 2 is a plan view of the litter device of FIG. 1;
FIG. 3 is a view generally on the line 3—3 of FIG. 2.

The litter is indicated generally at 10 and is molded or built up as a unitary shell structure having substantial rigidity. For example, the shell is formed of fiberglass which is coated or impregnated with a suitable fire or heat resistant material, such as a plastic compound known in the art. The foam plastic material will be incorporated in the shell in a manner to be protected by the fire and heat resistant material. The litter is an elongate structure having a bottom with side and end walls forming an enclosure having a standard size for receiving patients of various statures or it may be constructed, for example, in large and small sizes in order to be readily available for use with patients of small or large stature. The over-all width of the shell will be such as to permit its manipulation through the usual openings in sea or air transports. Additionally, the litter is shaped to provide top and bottom surfaces which permit a number to be conveniently and compactly stacked.

The litter 10, although unitary, may be considered, for the purpose of explanation, to comprise an upper or trunk section 11 and a lower or leg section 12, each of which makes up approximately one-half of the shell. The wall forming the shell will be relatively thin to provide lightness and ease of handling and as shown in FIGS. 1 and 2, the shell provides a generally straight lined structure preferably having curved head and foot ends 13 and 14, as shown.

The general shell construction of the litter is modified in several respects in order to enhance its utility. For example, as shown in FIG. 2, the trunk portion 11 is provided with inwardly extending flanges 15—16 which form a confined spaced 17 therebetween having the general contour of a person's head permitting its passage therethrough. The zones beneath the flanges 15 and 16 are thickened or built up with a foam plastic as is the head rest zone defined by the sloping or inclined line 18.

As shown in FIG. 2, and the detail of FIG. 3, the leg section 12 is provided with a medial rib 20 which forms with the side walls of the shell groovular portions 21 and 22 in which a patient's legs may repose.

For the purpose of manually handling the litter or maneuvering it by hoist lines, gripping spaces 24 are formed along the upper edge of the shell at suitably spaced intervals. As shown in FIGS. 1 and 2, these spaces have cross rods or pieces 25 which may and preferably are molded or otherwise secured therein when the shell is constructed. For the purpose of immobilizing a body which is placed in the shell, connections 26 of general U-shape are also secured in the shell at suitably spaced intervals and are arranged along both sides of the shell as shown in FIG. 2 in cooperating pairs. One pair provides an arrangement for receiving a releasable strap or belt 27 along the area of the patient's chest and one pair for receiving another strap or belt 28 along the area of a patient's waist.

The foam plastic zones in the head and shoulder area protect a patient who is immobilized in the litter 10, in case it for some reason is dropped into a body of water since this foam plastic zone tends to maintain the litter at an angle to the vertical which prevents water from submerging at least the face portion of the patient. Additionally, a U-shaped chest piece 30, also formed of a foamed plastic is shown in FIGS. 1 and 2 and is removably mounted to the shell. For this purpose a rod 31 is molded in the upper edges of the shell at either side and each rod receives the eye of a stay bolt 32. The stay bolts are operative to lock flanges 33 of the chest piece by means of a washer and winged nut assembly 34.

Obviously many modifications and variations of the present invention are possible in the light of the above teachings. It is therefore to be understood that within the scope of the appended claim the invention may be practiced otherwise than as specifically described.

I claim:

A litter comprising:
(a) a rigid shell formed of a floatable plastic material and shaped to provide a base with upstanding side walls and end walls,
(b) said shell having at one end portion a first zone of buoyant foam material extending upwardly from the base and inwardly from one side wall and a second zone of buoyant foam material extending upwardly from the base and inwardly from the other side wall,
(c) said first and second zones having a common width providing a space therebetween for the reception of the head and neck of the body of a patient and a common length providing abutments for shoulders of a patient,
(d) an elongate central relatively narrow rib formed integrally with the base and located in the other end portion of the shell,
(e) said rib extending inwardly of the base and having sufficient thickness to define a channel with each of the side walls of the shell for the reception of the legs of a patient and
(f) a plurality of transverse straps interconnecting the side walls of the shell and located between the central rib and the buoyant zones whereby the body of a patient will be maintained in supine position during transport.

References Cited in the file of this patent

UNITED STATES PATENTS

| | | |
|---|---|---|
| 2,519,376 | Jennings | Aug. 22, 1950 |
| 2,655,485 | Hoffman | Oct. 13, 1953 |
| 3,038,175 | Faget et al. | June 12, 1962 |
| 3,067,441 | Dysard et al. | Dec. 11, 1962 |

FOREIGN PATENTS

| | | |
|---|---|---|
| 436,459 | Great Britain | Oct. 14, 1935 |